United States Patent [19]

Kingston

[11] Patent Number: 5,628,354

[45] Date of Patent: May 13, 1997

[54] TREE PROCESSOR ATTACHMENT FOR LOG PORTERS

[75] Inventor: Aloysius Kingston, Newcastle, Canada

[73] Assignee: Sunny Corner Enterprises Inc, Miramichi, Canada

[21] Appl. No.: 554,701

[22] Filed: Nov. 7, 1995

[51] Int. Cl.⁶ .................... A01G 23/02; B27C 9/00; B27B 1/00

[52] U.S. Cl. .............. 144/338; 144/4.1; 144/24.13; 144/356

[58] Field of Search .................. 144/4.1, 24.13, 144/335, 338, 343, 356, 357

[56] References Cited

U.S. PATENT DOCUMENTS

| | | |
|---|---|---|
| 3,557,849 | 1/1971 | Martinson . |
| 3,735,786 | 5/1973 | Vit ........................... 144/24.13 |
| 4,034,785 | 7/1977 | Tucek ........................ 144/24.13 |
| 4,056,135 | 11/1977 | Whitcomb ................... 144/24.13 |
| 4,130,151 | 12/1978 | Ericsson .................... 144/24.13 |
| 4,164,246 | 8/1979 | Savage et al. ............... 144/24.13 |
| 4,167,960 | 9/1979 | Wildey ...................... 144/24.13 |
| 4,194,542 | 3/1980 | Eriksson .................... 144/24.13 |
| 4,276,918 | 7/1981 | Sigoin ...................... 144/24.13 |
| 4,350,188 | 9/1982 | Adolfsson ................... 144/24.13 |
| 4,382,457 | 5/1983 | Hahn ........................ 144/24.13 |
| 4,428,407 | 1/1984 | Bourbeau .................... 144/24.13 |
| 4,582,104 | 4/1986 | Sigoin ...................... 144/24.13 |
| 4,766,939 | 8/1988 | Forslund .................... 144/24.13 |
| 4,779,654 | 10/1988 | Casperson et al. ............ 144/24.13 |
| 4,899,794 | 2/1990 | Hamby ....................... 144/24.13 |
| 4,981,163 | 1/1991 | Westlund .................... 144/338 |
| 5,219,010 | 6/1993 | Erikson ..................... 144/24.13 |
| 5,293,914 | 3/1994 | Hudson ...................... 144/24.13 |
| 5,406,997 | 4/1995 | Davison ..................... 144/24.13 |

FOREIGN PATENT DOCUMENTS

| | | |
|---|---|---|
| 816464 | 7/1969 | Canada . |
| 965335 | 4/1975 | Canada . |

*Primary Examiner*—W. Donald Bray
*Attorney, Agent, or Firm*—Mario D. Theriault

[57] ABSTRACT

In the present invention, there is provided a tree processor attachment for optionally mounting transversely on a forward section of the log carrying portion of a log porter, so that a log porter may advantageously be used to process felled trees, and to carry logs therefrom to a forest road. The tree processor attachment comprises a tree trunk holding and severing portion and a tree trunk advancing and delimbing portion having a pair of tree trunk delimbing jaws. The tree trunk advancing and delimbing portion is telescopically mounted in the tree trunk holding and severing portion, and is movable back and forth a pair of tree trunk holding jaws. The tree trunk advancing and delimbing portion is timely operable in association with the tree trunk holding jaws for moving a tree trunk in successive unidirectional movements toward a tree trunk severing saw. The tree holding and severing portion of the tree processor attachment is rotatable within a sway angle about a swivel member on a mounting base thereof. The tree processor attachment also comprises control means for selectively severing logs at a first sway position or at a second sway position, depending upon a setting of this control means.

20 Claims, 9 Drawing Sheets

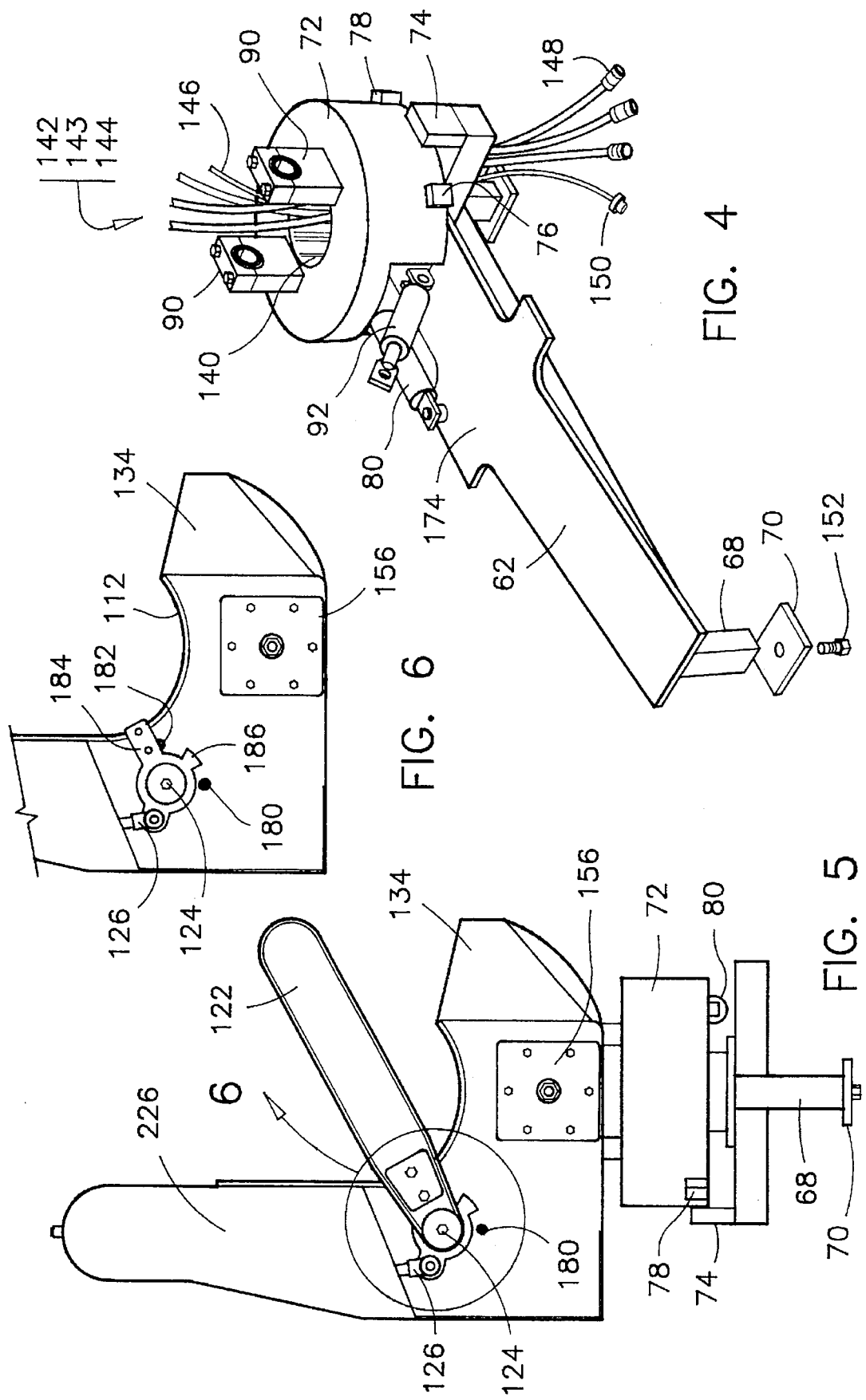

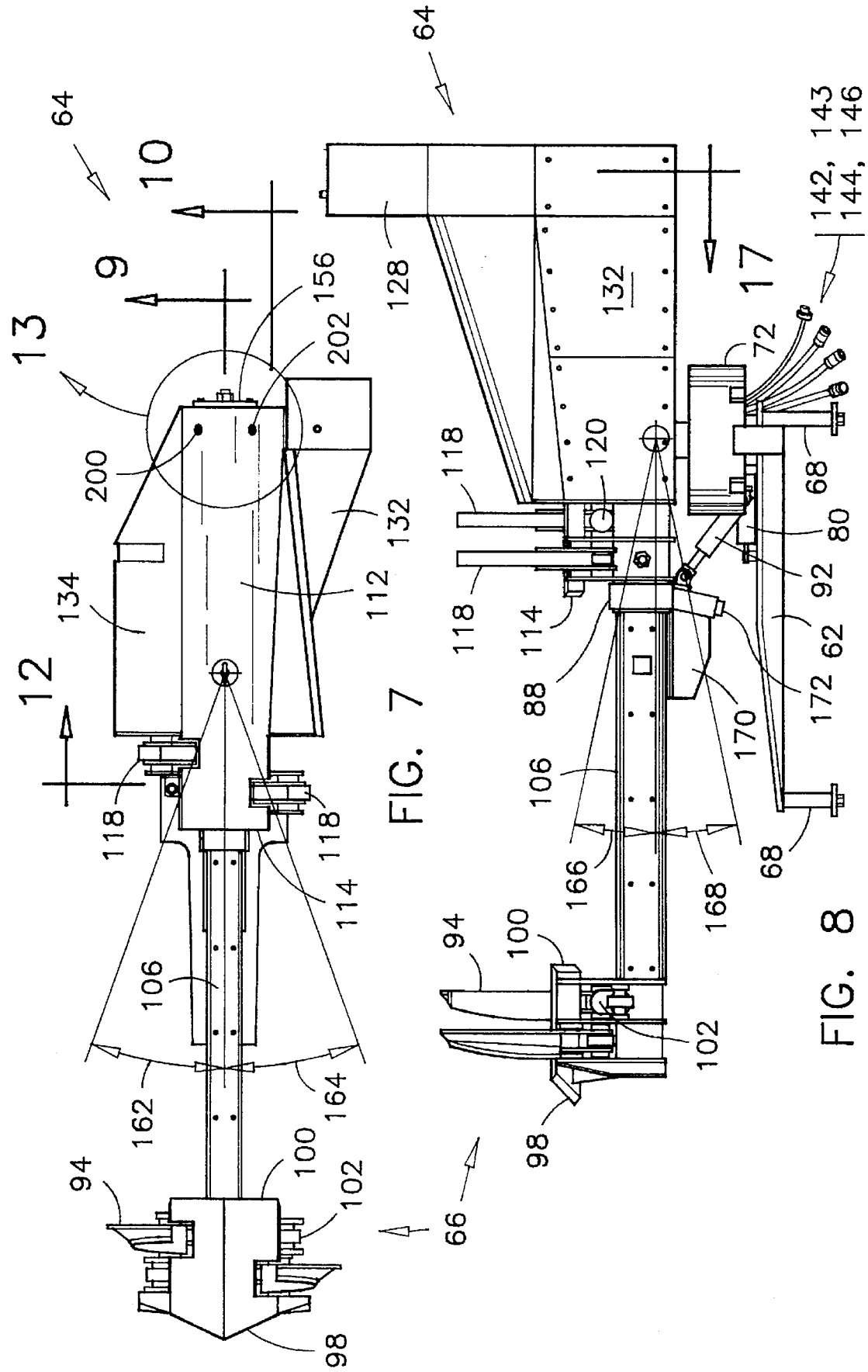

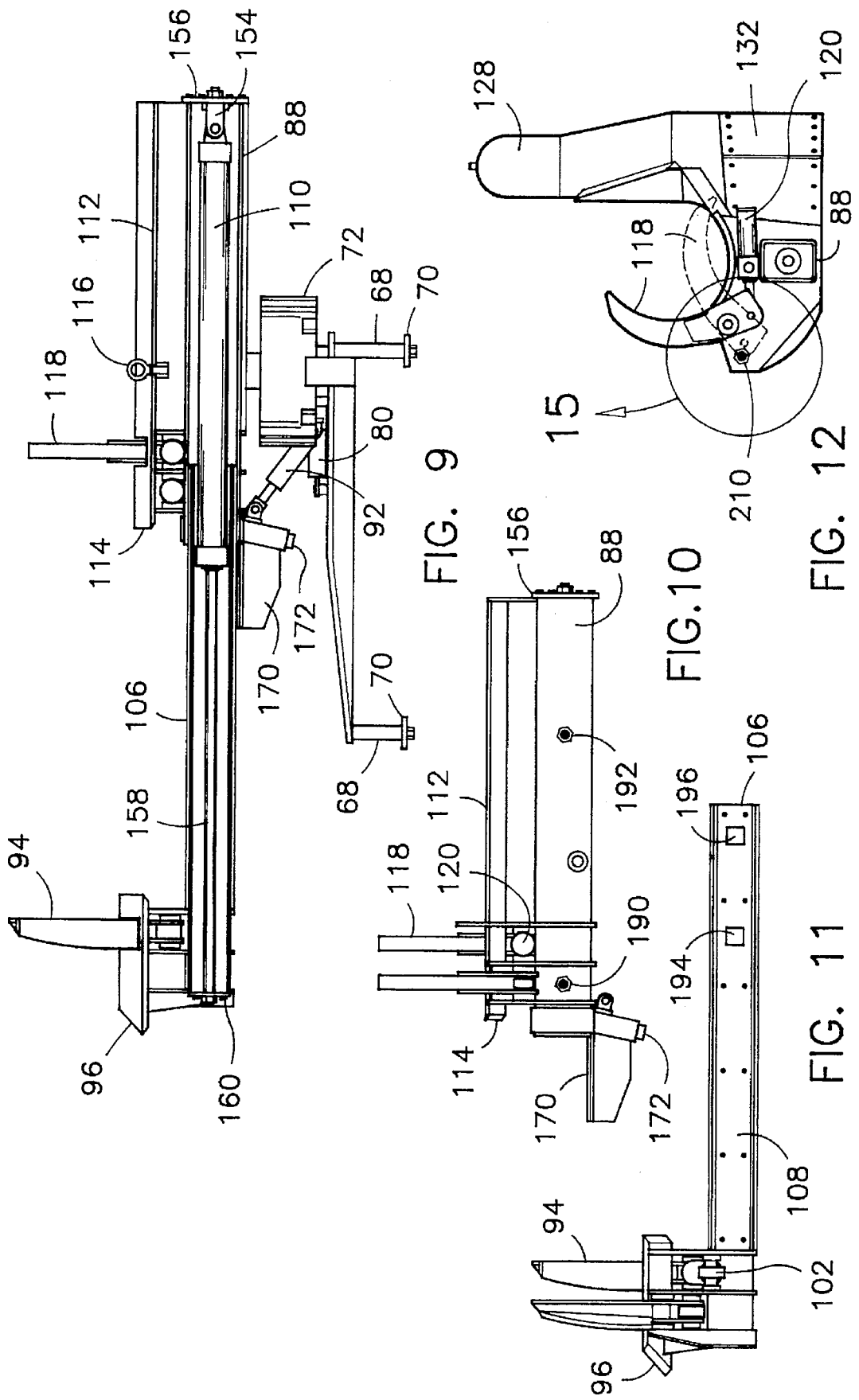

TREE PROCESSOR ATTACHMENT FOR LOG PORTERS

FIELD OF THE INVENTION

The present invention relates to a tree processor attachment for log forwarders, commonly called log porters. More particularly, the invention relates to a tree delimbing and severing attachment, which is optionally mounted on a log carrying portion of a log porter.

BACKGROUND OF THE INVENTION

Modern tree harvesting operations generally comprise equipment such as a land vehicle with large-diameter wheels or a pair of crawler tracks. The vehicle is generally equipped with a multi-function tree processing apparatus mounted at the end of an articulated boom. The tree processing apparatus can fell a tree, delimb it and severe the tree trunk into sawmill logs and pulpwood in a single sequence of operation. The logs are thereafter picked up and forwarded near a forest road by log porters.

These modern operations are efficient in the sense that logs are transported from stump sites to roadside in only two machine manipulations. This is a commendable improvement over the multiple sequences of a conventional practice comprising felling, skidding, piling, delimbing, piling again, severing and stacking in cords along a trucking road.

Examples of these multi-function tree processing apparatus are disclosed in U.S. Pat. No. 4,766,939 issued on Aug. 30, 1988 to Torsten Forslund, and in U.S. Pat. No. 5,219,010 issued on Jun. 15, 1993 to Peter Eriksson.

The introduction of these multi-function tree processing apparatus in the forest industry has made conventional delimbing machines less wanted. Examples of conventional delimbing machines are described in U.S. Pat. No. 4,276,918 issued on Jul. 7, 1981 to Roger Sigouin, and in U.S. Pat. No. 4,382,457 issued on May 10, 1983 to Raymond M. Hahn. In the first example, a sliding boom is mounted atop a track type excavator. The sliding boom is used to delimb, to cut the top portion of full length trees, and to pile those trees awaiting further processing by a severing machine. In the second example, the machine is movable on wheels to drive it near piles of felled trees. The machine has an articulated boom, a pair of sliding delimbing blades, a tree trunk severing saw, and a log sorting mechanism with two cradles to separate sawmill logs from pulpwood. The sorted logs are periodically handled out of the cradles by the articulated boom and piled in a location where a porter may thereafter carry these logs to a roadside site.

In both examples, the delimbing machines are limited to work near piles of trees accumulated by forwarders or by a feller-buncher machine. Thus the additional cost of operating the delimbing machines renders a forestry operation less profitable than the use of a multi-function tree processing apparatus as firstly described.

In other typical forestry operations, a variety of delimbing attachments have been developed to operate in combination with an articulated boom of a log loader. For examples U.S. Pat. No. 4,899,794 issued Feb. 13, 1990 to Thomas E. Hamby, Jr. and U.S. Pat. No. 5,406,997 issued Apr. 18, 1995 to Tim Davison, disclose a first type of tree delimbing device where the tree is drawn through a pair of limb stripping blades by the grapple of a log loader.

A second type of tree delimbing attachment for use in cooperation with an articulated loader boom is illustrated in U.S. Pat. No. 4,167,960 issued Sep. 18, 1979 to Allan J. Wildey, and in U.S. Pat. No. 5,293,914 issued on Mar. 15, 1994 to Thomas H. Hudson. In both devices, there is provided a pair of delimbing blades and a tree topping mechanism.

A common inconvenience with both types of delimbing attachments of the prior art is that the operation of the log loader is dedicated to a single function of operating the delimbing attachment. The loader-delimber combination works from a pile of trees which has been previously accumulated by forwarders, by skidders or by a feller-buncher machine. Furthermore, a severing machine is subsequently required to cut the trees into logs of appropriate lengths. Therefore, this type of operation is also relatively expensive as compared to multi-function apparatus of the present-day trend.

Although the multi-function tree processing apparatus are very efficient, the investment in a mobile machine with an articulated boom and a tree processing apparatus mounted thereon requires the obtainment of large wood harvesting contracts where a machine can work around the clock for several months per year.

This type of operation is generally not feasible for small and medium size forestry contractors where the tree processing machines are only periodically utilized. Hence the small and medium size forestry contractors must contrive to remain competitive using conventional machinery.

In another aspect of a present-day forestry operation, the small and medium size forestry contractors generally have one or more log porters. The small and medium size contractors referred to herein are those contractors having few employees, and even the self-employed woodcutters.

Log porters are generally of the articulated type with a front drive portion having an engine and a cab for an operator, and a rear log carrying portion having a loader boom. The front and rear portions are normally connected by a steering joint. A porter is generally equipped with large-diameter wheels such that it can carry heavy loads on rough terrains. The machines are particularly agile in moving about through harvested forest land to gather logs from one pile of logs to the next.

Log porters have traditionally been working exclusively on carrying logs out of the forest, and a return on investment therefor has been limited to this activity alone.

SUMMARY OF THE INVENTION

In the present invention, there is provided a tree processor attachment for optionally mounting on the log carrying portion of a log porter, so that a log porter may advantageously be used to process felled trees, and to carry logs therefrom to a forest road.

The tree processor attachment of the present invention comprises a tree trunk holding and severing portion having tree trunk holding means and a tree trunk severing means, and a tree trunk advancing and delimbing portion having tree trunk advancing means and a tree trunk delimbing means. The tree trunk advancing and delimbing portion is telescopically mounted in the tree trunk holding and severing portion, and is movable back and forth the tree trunk holding means along a tree trunk advancing axis.

The tree trunk advancing means is timely operable in association with the tree trunk holding means for moving the tree trunk in successive unidirectional movements along the tree trunk advancing axis, toward the tree trunk severing means.

The tree processor attachment of the present invention also comprises mounting means for retaining the tree trunk holding and severing portion to the log carrying portion of the log porter, and hose means for receiving hydraulic power from an hydraulic power supply system of the log porter.

A first advantage of the tree processor attachment of the present invention is that an owner of a log porter may carry the tree processor attachment about a forest to delimb and severe felled trees into logs. The tree processor attachment of the present invention is relatively inexpensive to purchase and to operate as compared to the aforesaid modern multi-function tree processing apparatus.

Hence the small and medium size forestry contractors, as well as the larger ones, may expand the scope of utilization of their log porters. Furthermore, an owner of a log porter may use the tree processor attachment of the present invention to profitably carry through entire wood harvesting contracts.

In accordance to another aspect of the present invention, the log porter has a log loader boom for handling felled trees into the tree processor attachment. The tree processor attachment is mounted transversely on a forward section of a log carrying portion of the log porter. A major part of the log carrying portion remains unobstructed such that the log porter can still adequately carry logs.

Hence a second advantage of this other aspect of the present invention is that the combination of the log porter and the tree processor attachment is used to process felled trees at stump sites and to carry the logs therefrom in various lengths to a forest road. The felled trees are thus processed and carried near a forest road in one machine manipulation.

The method of harvesting a forest is particularly efficient for harvesting a stand of trees felled by strong winds for example. The method of harvesting a forest is also particularly efficient for the small and medium size forestry contractors working with a team of woodcutters.

In accordance to a further aspect of the present invention, the tree holding and severing portion of the tree processor attachment is rotatable within a sway angle about a swivel member on the mounting base thereof. The tree processor attachment also comprises control means for selectively severing togs at a first sway position or at a second sway position, depending upon a setting of this control means.

A further advantage of this embodiment is that sawmill logs may be separated from pulpwood during the processing of trees. These logs may thereafter be grouped on board the porter according to their respective length and classification. Logs transported according to such method are easily separated along a forest road into distinct piles.

BRIEF DESCRIPTION OF THE DRAWINGS

The preferred embodiment of the invention will be further understood from the following description, with reference to the drawings in which;

FIG. 4 is a perspective view of the base of the tree processor attachment of FIG. 3.

FIG. 5 illustrates the severing saw of the tree processor attachment.

FIG. 6 illustrates the proximity switches controlling the movements of the severing saw of the tree processor attachment.

FIG. 7 is a top view of the tree processor attachment.

FIG. 8 is a side view of the tree processor attachment.

FIG. 9 is a cross section view of the tree processor attachment along line 9 of FIG. 7. The figure illustrates the main hydraulic cylinder effecting an extension of the sliding boom.

FIG. 10 is a cross section view of the tree processor attachment along line 10 of FIG. 7. The Figure illustrates the preferred location of the proximity switches controlling the extension and retraction of the sliding boom within the main boom.

FIG. 11 is a side view of the sliding boom of the preferred embodiment.

FIG. 12 is a cross section view of the tree processor attachment along line 12 of FIG. 7. The Figure illustrates the proximity switch for detecting a minimum trunk diameter.

DETAILED DESCRIPTION OF THE PREFERRED EMBODIMENT

Figure 1:
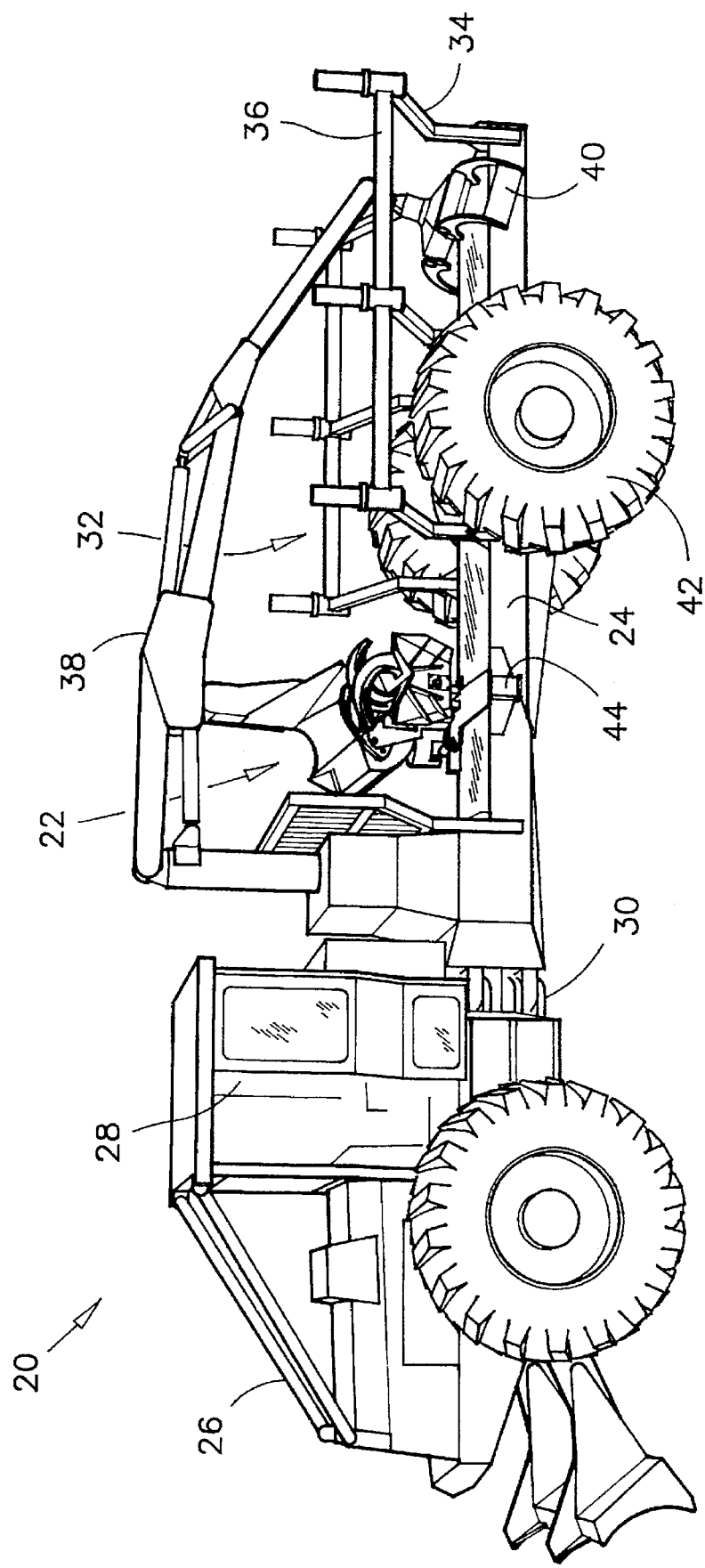
FIG. 1 is a perspective side view of a log porter with a tree processor attachment mounted on a log carrying portion thereof.

Referring to FIG. 1, there is illustrated a log porter 20 and a tree processor attachment 22 mounted transversely on a log carrying portion 24 thereof. The log porter 20 of the preferred embodiment comprises a front portion 26 having a cab 28 for an operator, and a rear log carrying portion 24 connected to the front portion by an articulated joint 30. The log carrying portion of the preferred log porter has a log cradle 32 made of several cradle posts 34 and a horizontal bar 36 on each side of the log carrying portion 24. The log porter of the preferred embodiment also comprises an articulated boom 38 and a log grapple 40 attached to the end of the boom 38.

The log cradle 32 of the preferred log porter is a modified version from an original cradle. A portion of the cradle 32 on a front side of the rear wheels 42 of the vehicle 20 has been removed. The tree processor attachment 22 is thereafter mounted in two mounting pockets 44 where a pair of front cradle posts were originally installed. In this preferred embodiment, a major portion of the log cradle 32 remains unobstructed such that the log porter 20 retains its ability to carry logs.

Figure 2:
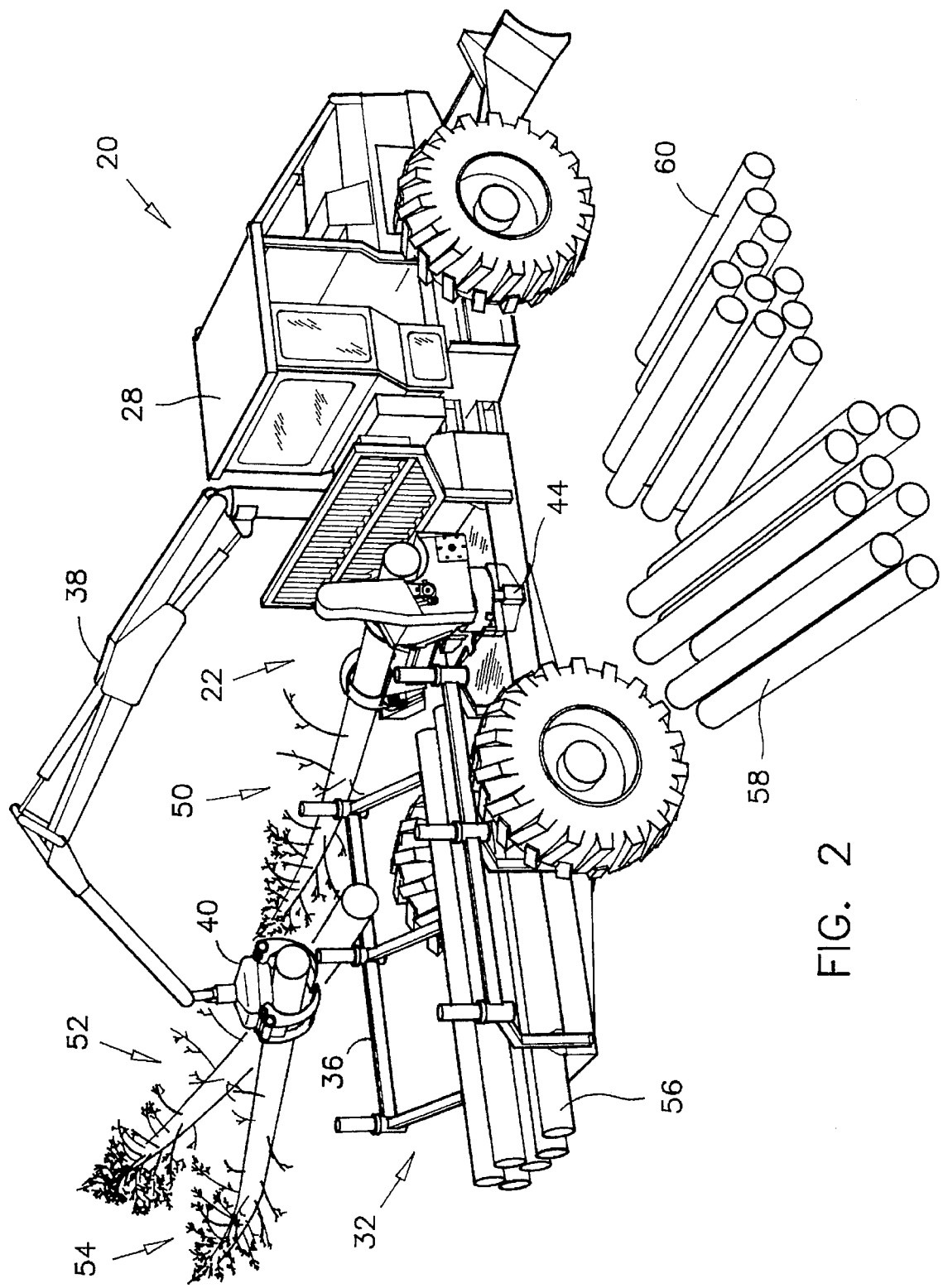
FIG. 2 is a perspective view of a tree processing operation.
Figure 3:
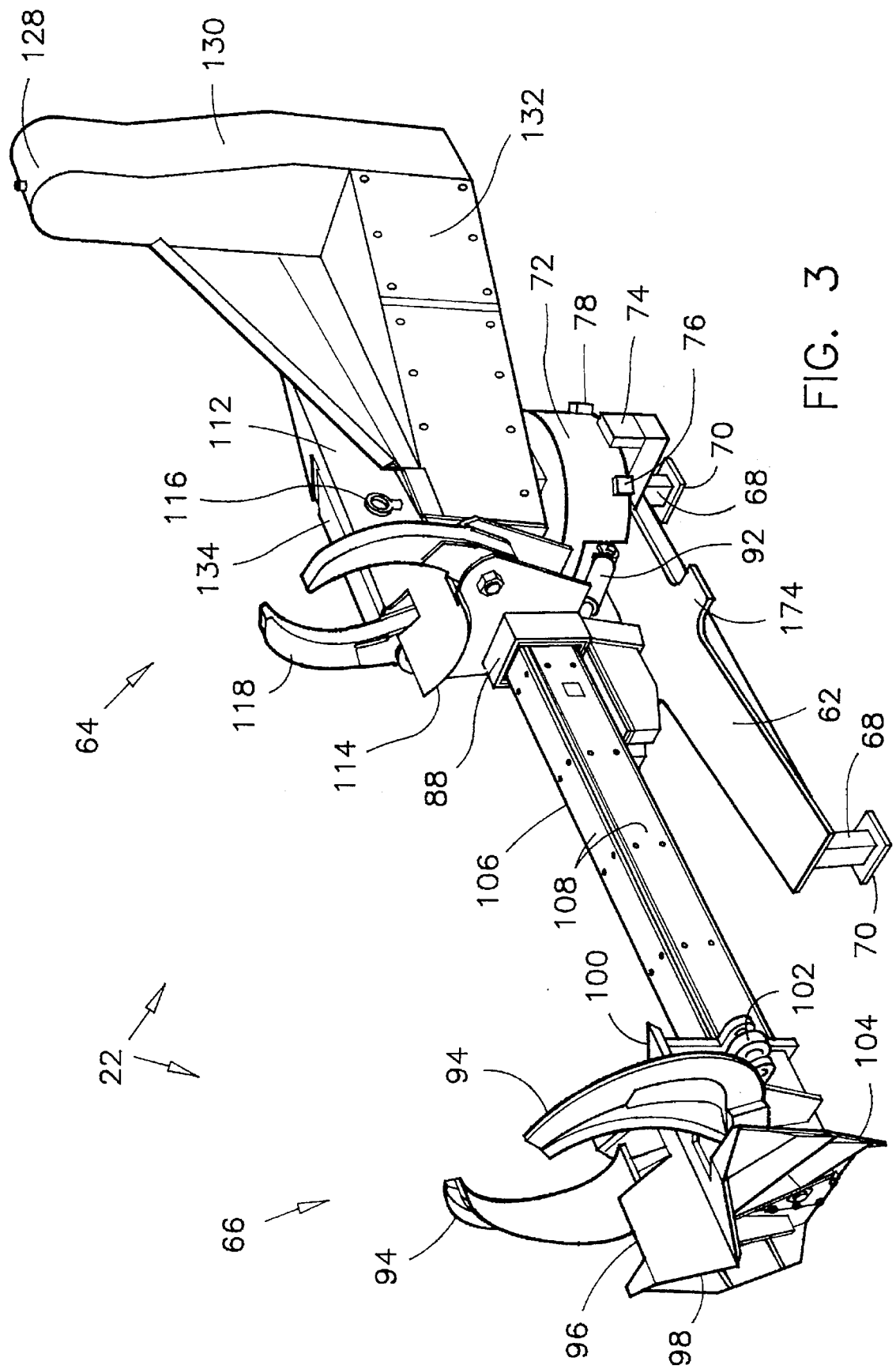
FIG. 3 is a perspective view of the tree processor attachment of the preferred embodiment.

Referring now to FIG. 2, there is illustrated a suggested method of operating a log porter 20 having a tree processor attachment 22 mounted thereon. The log porter 20 of the illustration is positioned near felled trees, and preferably near the stumps of felled trees. These trees may have been felled by wood cutters working with power saws, or by a feller machine of a large harvesting operation.

The tree processor attachment 22 of the preferred embodiment has a programmable controller for automatically controlling the processing of a tree. The tree processor attachment 22 has delimbing means for removing the branches of a tree, measuring and cutting means for severing a tree trunk into logs of different lengths, and a base with swivel means for separating sawmill logs from pulpwood.

In the illustration of FIG. 2, a first tree 50 is being processed in the tree processor attachment 22 of the present invention. A second tree 52 is positioned with a butt end thereof resting on the horizontal bar 36 of the cradle 32. A third tree 54 is being pulled near the porter 20 by the grapple 40 of the porter's boom 38.

The operation of the tree processor attachment 22 being one of an automatic mode, the operator of the machine has sufficient time between each tree processing cycle to accumulate trees near the tree processor attachment 22, as exemplified by trees 52 and 54.

A preferred method of operation of the log porter/processor combination includes the step of separating with the loader boom 38, the 16 ft logs 56 from the 12 ft logs 58, and to pile the 16 ft logs 56 in the porter's cradle 32 as illustrated. It is further suggested to stack the 12 ft sawmill logs 58 and the 8 ft pulpwood logs 60 atop the 16 ft logs in the cradle 32 for transporting these logs along a trucking road, or to another accumulation of felled trees. The log carrying portion of the porter 20 behind the tree processor attachment 22 of the preferred embodiment is sufficiently long for supporting 16 ft logs without critically overhanging a portion thereof at the rear end of the cradle 32. When logs are transported along a forest road, the logs grouped in the cradle as per the suggested method are easily separated into distinct piles.

The aforesaid method for harvesting trees is particularly economical for the felled trees are delimbed, processed into logs and carried from stump sites to a forest road in only one machine manipulation.

Furthermore, the method of harvesting trees where a porter 20 moves often to pick felled trees at stump sites is ecologically right for leaving the branches evenly distributed on the forest floor. This practice, as opposed to the conventional delimbing from large piles of felled trees, adds to the biomass of the forest floor, and helps to fertilize the soil for a better regeneration of the harvested stand.

Referring now to FIGS. 3 to 19 there is illustrated a preferred embodiment of a tree processor attachment 22 for mounting on log carrying portion 24 of a log porter 20. The tree processor attachment 22 comprises generally a base 62, a trunk holding and severing portion 64 and a tree trunk advancing and delimbing portion 66. The base 62 has at each end a peg member 68 and a cap plate 70 for retaining the respective peg member 68 into a pocket 44 along the log carrying portion 24 of the log porter 20. The base 62 also has a swivel support 72 allowing horizontal sway movement of the log holding and severing portion 64. The sway movement of the swivel support 72 is limited by angular stopper 74, between a first sway limiting block 76 and a second sway limiting block 78. The sway movement of the swivel support 72 is controlled by an hydraulic cylinder 80, as better seen on FIG. 4. The swivel support 72 is optionally controlled by the cylinder 80, or allowed to float freely from side to side by an hydraulic valve system bypassing a controlling valve of cylinder 80.

A main boom 88 of the trunk holding and severing portion 64 is pivotally mounted into a pair of bearing blocks 90 as also illustrated on FIG. 4. A second hydraulic cylinder 92 controls the tilting of the main boom 88 about an axis of bearing blocks 90. The tilting of the main boom 88 is also optionally controlled by cylinder 92 or allowed to float freely in an up and down direction by an hydraulic valve system bypassing a controlling valve of cylinder 92.

While the swivelling of the trunk holding and severing portion 64 is used to separate sawmill logs and pulpwood in two distinct piles, the tilting of the base is advantageously used to lay logs on these piles with the far end first, with the near end first, or straight down according to the profile of the ground under the piles. This option is particularly useful to make neat piles which are easy to grab and load on board before the porter departs to another accumulation of felled trees.

The trunk advancing and delimbing portion 66 of the tree processor attachment 22 comprises a pair of delimbing jaws 94, an anvil plate 96 having a first cutting edge 98 at a far end thereof and a second cutting edge 100 at a near thereof. Each delimbing jaw 94 is operated in and out about a pivot by means of an hydraulic cylinder, one of which is partly seen at numeral 102 of FIG. 3. The trunk advancing and delimbing portion 66 also has a deflector plate 104 for preventing the branches removed from the processed trees to become caught behind the support mechanisms of the delimbing jaws 94.

The trunk advancing and delimbing portion 66 is guided in a reciprocal longitudinal movement by means of a rectangular boom 106 covered by strips 108 of wear resistant material, and telescopically sliding into the main boom 88. The reciprocal movement of the sliding boom 106 is controlled by a main hydraulic cylinder 110 mounted inside both the main boom 88 and the sliding boom 106. The main cylinder 110 has a casing end attached to a first end of the main boom 88 and a rod end attached to a far end of sliding boom 106. The main cylinder 110 is illustrated on FIG. 9. A preferred stroke length for this main cylinder 10 is 50 inches, such that log lengths are measured in multiples of 50 inches. The lengths of sawmill logs determined in this manner comply to usual log length requirements common in the sawmill industry.

The trunk holding and severing portion 64 of the tree processor 22 comprises a concave table 112 having a cutting edge 114. When the advancing and delimbing portion 66 is fully retracted, the cutting edge 100 of the advancing and delimbing portion 66 remains at a safe distance of about 2 inches from cutting edge 114.

The concave table 112 may also comprise a removable eye hook 116 for easily handling the tree processor attachment 22 with the grapple 40 of the log loader during installation or removal of it from the pockets 44 of the log porter 20.

The trunk holding and severing portion 64 has a pair of holding jaws 118 which are operable in and out by a respective hydraulic cylinder 120. Each cylinder 120 is of the trunnion mount type, as illustrated on FIGS. 12 and 15.

The trunk holding and severing portion 64 further has a chain saw blade 122 which is driven by an hydraulic motor (not shown), and which is activated in a up or down movement about an output shaft 124 of the hydraulic motor by an hydraulic cylinder 126.

The trunk holding and severing portion 64 of the tree processor attachment 22 further has a chain lubrication reservoir 128, a lubrication pump compartment 130, a first hydraulic valve compartment 132 on a first side, and a second control component compartment 134 on a second side thereof. The hydraulic valves of the tree processor attachment 22 of the preferred embodiment are of the solenoid operated type such that the operation of the tree processor attachment 22 may be effected by a programmable controller, as it will be explained later.

Referring now specifically to FIG. 4, the swivel support 72 has a large opening 140 at a central portion thereof, communicating with a similar opening (not shown) between the base 62 and the housing of the swivel support 72 as illustrated on FIGS. 4 and 8. The tree processor attachment 22 being operated from banks of solenoid valves within the valve compartments 132 and 134, the hydraulic connections to the tree processor are limited to a pressure hose 142, a return-to-tank hose 143, and a hydraulic drain hose 144. The electrical connections to the solenoid valves and input switches are contained in a single control cable 146. It is further recommended the these hoses be equipped with quick disconnect couplings 148, and the electrical cable be equipped with a quick attachment connector 150.

The tree processor attachment 22 of the preferred embodiment is particularly easy to install on a log porter 20. The installation procedure is limited to lowering the tree processor attachment 22 onto the frame of the porter 20 and aligning both peg members 68 into a respective pocket 44 along the porter's frame. The tree processor is preferably secured in place by affixing on each peg member 68 a retaining plate 70 under a respective pocket 44. Each retaining plate 70 is held to each peg member 68 by means of a bolt 152 as illustrated on FIG. 4.

The hydraulic power supply hoses from the log porter 20 are preferably routed inside the frame of the porter through an opening (not shown) near the swivel support 72 such that a connection of these hoses and electrical cable may be effected quickly, and such that a minimum length of hoses are exposed to log processing conditions.

A tree processor attachment 22 equipped with such peg members 68, lifting eye bolt 116, quick attachment couplings 148 and connectors 150 may be installed or removed from a log porter 20 in less than one hour by two workers. Thus a porter 20 may be quickly modified to a full length cradle 32 when the operator of the machine wants to exclusively carry logs.

Furthermore, a tree processor attachment 22 of the preferred embodiment may be easily removed from a log porter 20 for maintenance for example. The tree processor attachment 22 may be easily taken off the log porter 20 and transported from a remote forest location to a maintenance shop for example, in a pick-up truck. Hence the tree processor attachment 22 may be overhauled during a weekend while the porter stays at a forestry operation.

It is recommended to operate the tree processor attachment 22 from an hydraulic pump (not shown) having between 30 and 35 U.S. gallons per minute capacity at 3000 psi. This hydraulic pump may be mounted piggyback style on the existing hydraulic pump of the log porter 20. Preferably, it is recommended to mount the tree processor's pump near the transmission of the porter and to operate it from a power-take-off accessory unit on the transmission, such that the pump may be disengaged completely during non-use periods. It is further recommended to install on the machine an additional hydraulic oil reservoir (not shown) to supply the tree processor attachment 22. This additional reservoir should have a capacity in U.S. gallons, of about 2 to 3 times the GPM rating of the recommended pump.

The tree processor attachment 22 of the preferred embodiment has been operated at production levels of 5 cords per hour by an operator who had received only a few days of training with the machine. This was obtained by operating the tree processor attachment 22 with an hydraulic pump of 30 U.S. gallons per minute. This level of production is favourably comparable to the output of modern multi-function tree processing apparatus as previously described, while a capital investment for machinery is relatively lower.

Referring specifically to FIG. 9, the casing end of the main cylinder 110 of the tree processor 22 is attached to a first end of the main boom 88 by means of a clevis 154 and a first cap plate 156. The rod 158 of the main cylinder is attached to a far end of the sliding boom 106 by means of a second cap plate 160. Thus the sliding boom 106 and the main cylinder 88 may be separated from the main boom 88 by working either one or both cap plates 154 and 160.

Referring back specifically to FIGS. 7 and 8, the recommended sway angle of the swivel support 72 as indicated by numerals 162 and 164 is 20° to the right and 20° to the left. The recommended tilt angle of the trunk retaining and severing portion 64 as indicated by numerals 166 and 168 is 120 up and down from a horizontal position. These articulations provide sufficient flexibility to a tree processor attachment 22 of the present invention when this tree processor attachment 22 is installed on a log porter 20 common in the forestry industry.

FIG. 8 also illustrates a main boom extension member 170 having a wear resistant surface, for supporting the sliding boom 106 during full stroke extension thereof. Adjacent this main boom extension member 170 is a support caster 172 for supporting the trunk holding and severing portion 64 during retraction of the tilt cylinder 92. The support caster 172 rolls over a widened portion 174 of the base 62 as one may see on FIGS. 3 and 4.

The automatic operation of the tree processor attachment 22 is controlled by a programmable logic controller (PLC) (not shown) preferably mounted in the operator's cab. The automatic operation of the tree processor attachment 22 is also controlled by a series of input switches and a series of solenoid operated hydraulic valves as previously mentioned.

The input switches comprises 7 proximity and photo switches. A first and second proximity switches 180 and 182 respectively control the up and down movement of the severing saw 122. The blade of the saw 122 as illustrated on FIGS. 5 and 6, is mounted on a collar plate 184 having a tab 186. The proximity switches 180 and 182 respectively are positioned such that tab 186 is positioned over first proximity switches 180, and causes the proximity switch 180 to latch on, when the saw blade 122 is in a down position. Similarly, the tab 186 causes the second proximity switch 182 to latch on when the saw blade 122 is at rest in an upper position.

The primary function of the first proximity switch 180 is to reverse the stroke of cylinder 126. The primary purpose of the second proximity switch 182 is to prevent an operation of all other functions of the tree processor attachment 22 when the severing saw 122 is in operation.

Referring now to FIGS. 10 and 11, a third and fourth proximity switches 190 and 192, control respectively the extension and retraction of the sliding boom 106. The proximity switches 190 and 192 work in cooperation with a first metal flag 194 and a second metal flag 196. When the sliding boom is extending, the first metal flag 194 signals the proximity switch 190 and causes the main cylinder 110 to decelerate to a low speed, through a solenoid valving system common in the trade of hydraulic power. Subsequently, metal flag 196 signals the proximity switch 190 again, and causes the main cylinder 110 to stop extending. Similarly, the retracting stroke is decelerated and stopped from the signals given by the metal flags 196 and 194 to proximity switch 192.

A recommended spacing between the first metal flag 194 and the second metal flag 196 is about 12 inches. This spacing provides an efficient deceleration pattern when the tree processor attachment 22 is powered by an hydraulic pump as previously recommended. It should be mentioned also that metal flag 194 and 196 may form a continuous strip of metal to accommodate a preference of the programmer of the PLC controlling the tree processor attachment 22.

Figure 14:
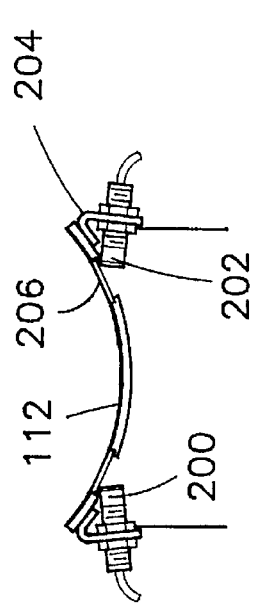
FIG. 14 is a cross section view of the tree processor attachment along line 14 of FIG. 13. The Figure illustrates the photo switches for detecting a butt end of a tree trunk.
Figure 15:
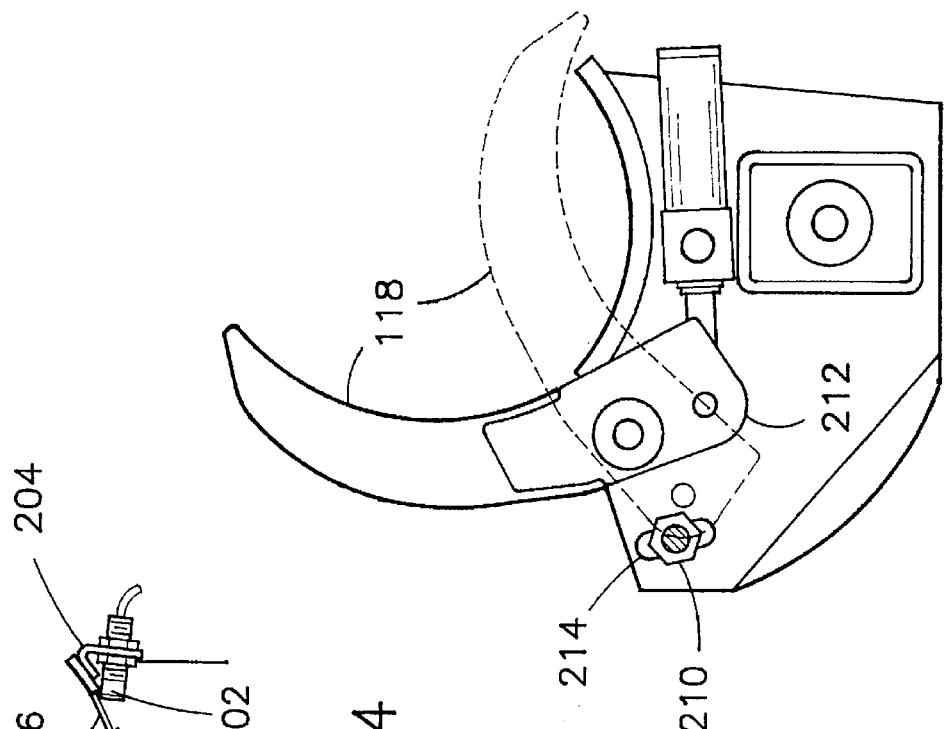
FIG. 15 is an enlarged view of detail 15 on FIG. 12. The figure explains the adjustment of the proximity switch for detecting a minimum trunk diameter.
Figure 13:
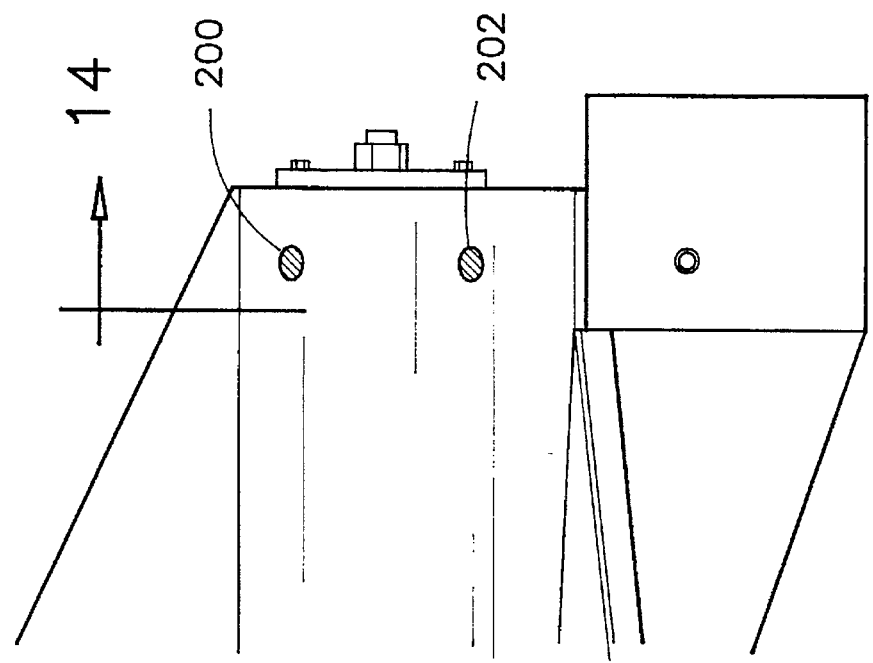
FIG. 13 is an enlarged view of the photo switches for detecting a butt end of a tree trunk. The Figure is an enlarged view of detail 13 of FIG. 7.
Figure 17:
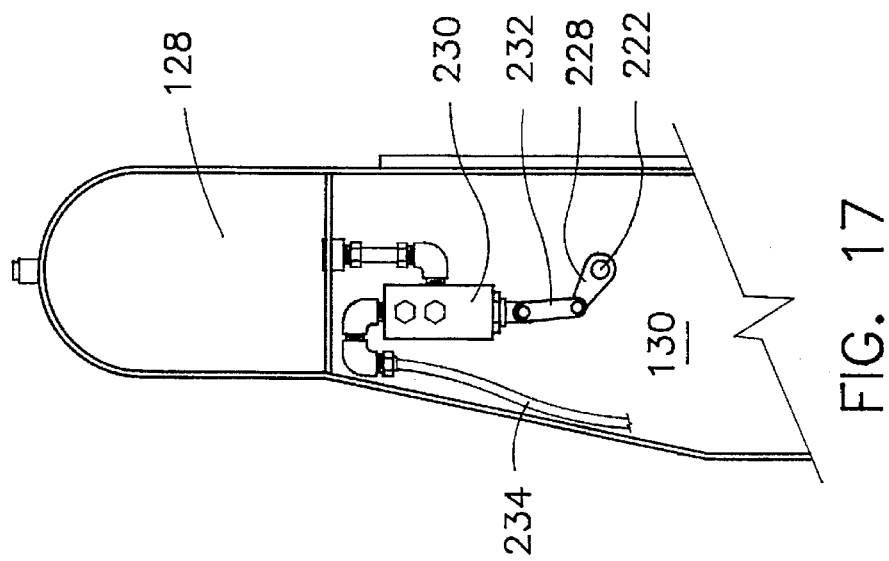
FIG. 17 is a partial cross section view of the tree processor attachment along line 17 of FIG. 8. The Figure illustrates the lubrication pump and a linkage means connected to the mechanism of FIG. 16.
Figure 16:
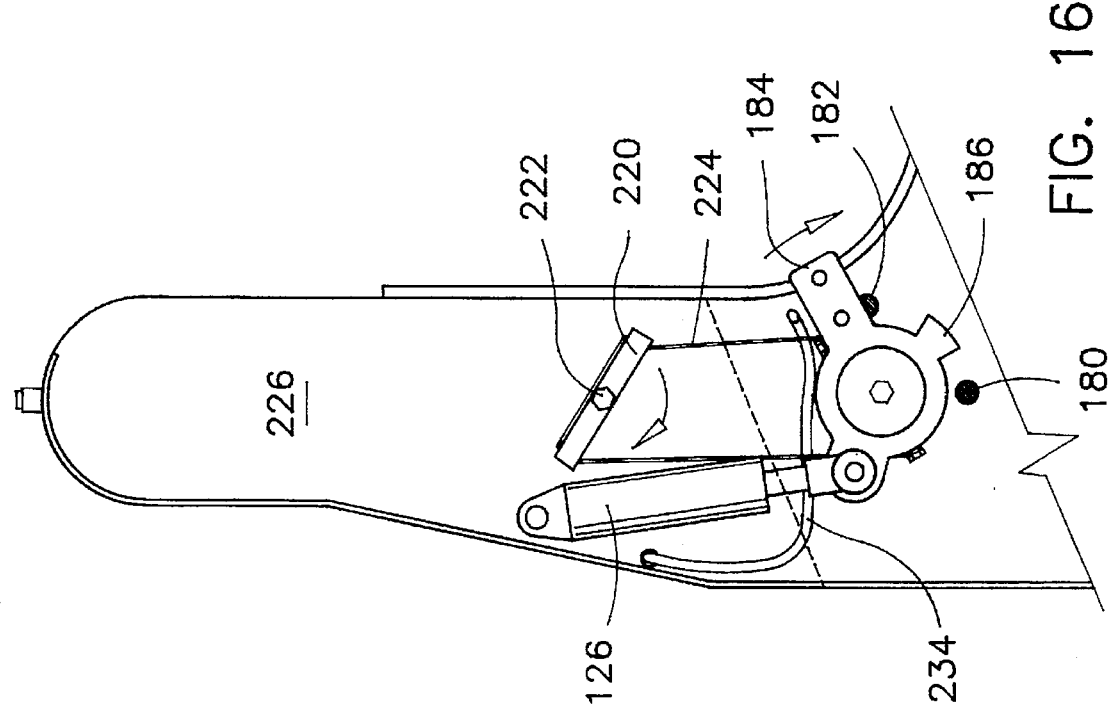
FIG. 16 is a partial view of the tree processor attachment showing a mechanism for operating a saw blade lubrication pump.

A fifth and sixth switches controlling the operation of the tree processor attachment 22 are photo-switches 200 and 202 respectively as illustrated on FIGS. 7, 13 and 14. These photo-switches 200 and 202 are used to locate the butt of every tree, and to initiate the measurement of the first log to be taken from a tree.

Photo-switches 200 and 202 are mounted on respective brackets 204 under the concave table 112. Photo-switches 200 and 202 may be of the retro-reflective, diffuse reflection or other type commonly used in the sawmill industry for detecting a presence of a log sliding thereby. Each photo-switch 200 OF 202 is protected from the shocks and debris of the tree processing operation by a lens 206 covering a hole in the concave table 112.

The seventh switch controlling the operation of the log processing attachment 22 is a proximity switch 210 located adjacent one of the holding jaws 118. The proximity switch 210 detects a heel portion 212 of one holding jaw 118 when this jaw is closed on a tree trunk. The position of the proximity switch 210 is adjustable within a slot 214 such that a magnetic signal from heel 212 passing over the proximity switch 210 is selectively detected from a specific diameter of a tree trunk. A preferred adjustment of proximity switch 210 is to give a signal on a tree trunk having a diameter of 3 inches or less. A signal from this proximity switch 210 instructs the PLC to initiate an unloading cycle after the next trunk severing motion.

Another aspect of importance of the tree processor attachment 22 is the arrangement of the saw blade lubrication system. The saw blade lubrication system as illustrated on FIGS. 16 and 17, comprises a balancing bar 220 pivoted on an axle 222, and which is connected to the collar plate 184 by means of cables 224 connected at each end of the bar 220. The balancing bar 220 and the hydraulic cylinder 126 are seen on FIG. 16, through a cover plate 226 of the saw blade compartment.

The axle 222 is connected to a pump actuator mechanism under the lubrication reservoir 128, and inside a lubrication pump compartment 130. The axle 222 is connected to a crank arm 228 which activates the piston of the lubrication pump 230 through a link bar 232. The lubrication pump 230 delivers lubricant to the saw blade 122 through a flexible conduit 234, which connects to the saw blade in a manner which is known in the trade of chain saws. In the mechanism just described, the lubrication pump 230 is actuated only during a downward movement of the saw blade 122. Therefore spillage of lubricant customary to rotary pump feed systems when the saw blade stalls during a downward motion, is thereby prevented.

Figure 18:
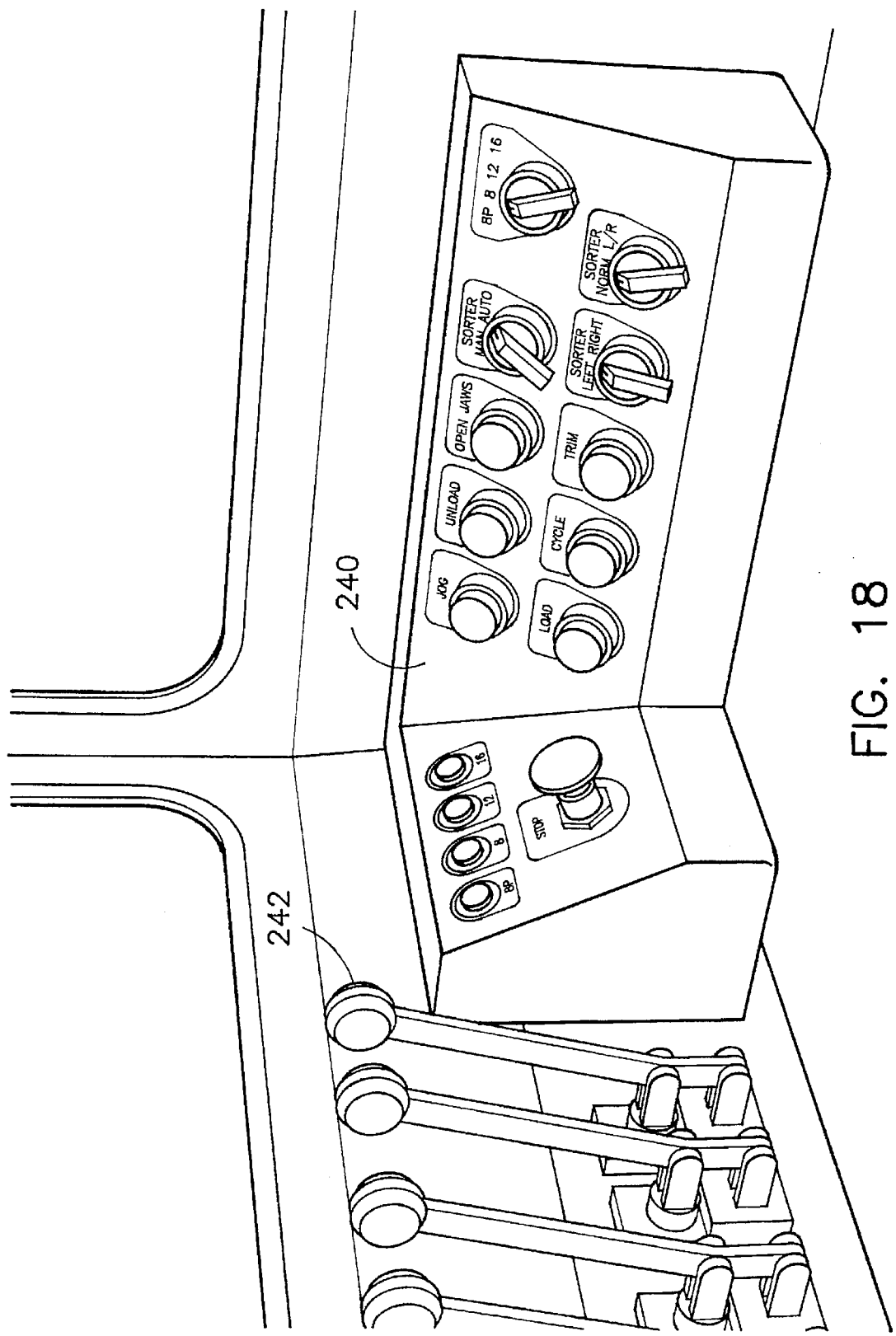
FIG. 18 illustrates the preferred arrangement of a control panel for operating the tree processor attachment of the preferred embodiment.

Referring back to the automatic controls of the tree processor attachment 22, a control panel 240 in the operator's cab 28, as illustrated on FIG. 18, is used to receive the operator's commands. The control panel 240 is preferably installed near a bank of levers 242 for operating the log loader boom 38.

Each function of the log processing attachment 22 will now be explained by making reference to a corresponding button on the control panel 240, Emergency Stop to stop under emergency conditions the operation of the tree processor attachment 22 at any time during any programs.

Pilot lights four pilot lights are provided above the emergency stop button to indicate to the operator the last log length selected.

Load

Once a tree is loaded with the log loader boom on the concave table 112, the operator must press this button to initiate a loading program.
The loading program causes the holding jaws 118 and the delimbing jaws 94 to close on the tree trunk, under a high hydraulic pressure.
The holding jaws 118 and the delimbing jaws 94 remain closed on the tree trunk for allowing the grapple of the loader boom to release its grab and to move away from the tree.

Cycle

Once a tree is loaded into the tree processor attachment, a processing program is initiated by depressing the cycle button. The cycle button causes the following actions to take effect;
The delimbing jaws 94 remain closed on the tree trunk, but under a low hydraulic pressure such that the delimbing jaws 94 will remain afloat about the trunk.
The advancing and delimbing portion 66 extends a full stroke, cutting all branches along its path.
The holding jaws 118 open.
The delimbing jaws 94 remain close on the trunk, but under a high holding pressure.
The advancing and delimbing portion 66 retracts until a signal is received from the butt locating photo-switches 200 and 202, and until a creep timer (not shown) indicates to the PLC that the butt end of the tree is located at a zero length point.
The holding jaws 118 close back.
The delimbing jaws 94 release their grab, but remain closed under a low hydraulic pressure.
The advancing and delimbing portion 66 extends a full stroke while the branches along that second portion of the trunk are cut off.
The advancing and delimbing portion 66 retracts and extends, cutting branches and measuring multiple of 50 inches before a trunk severing program is effected. During the movement of the advancing and delimbing portion 66, the holding jaws 118 and the delimbing jaws 94 alternate in retaining the tree trunk as previously described.
Once the selected length of log is reached, the advancing and delimbing portion 66 stops, and the saw blade 122 comes down and cuts a log from a butt end of the tree.
During a last stroke for reaching a selected log length, the swivel support 72 of the tree processor attachment 22 rotates to align the next log over one of two piles over which this log is to be dropped.

When a holding jaw 118 closes on a tree trunk having a diameter of 3 inches or less, an unload program is initiated.

An unload program causes the tree processor to continue delimbing and measuring that portion of the tree which was measured at 3 inches in diameter or less. Once the next severing cut is effected, the normal program reverses to pull the top portion of the tree out of the holding and severing portion 64 of the tree processor attachment. The advancing and delimbing portion 66 completes two full strokes to discard a top portion of a tree.

Thereafter, the advancing and delimbing portion 66 retracts fully with the delimbing jaws 94 open widely. The holding jaws 118 also open fully for receiving a next tree. Hence a load signal is normally expected after an unload program.

Log Length Selector Switch

Once the load program is completed, or during a first or a second stroke of the advancing and delimbing portion 66, the operator can select the length of the first log to be taken out of that tree. The log length selector switch also determines on which one of two piles the log will be dropped. The log length selector switch offers the operator the possibility to select one of; 8 foot pulpwood, 8 foot sawmill log, 12 foot sawmill log or 16 foot sawmill log. The actual length of logs are respectively 100 inches, 150 inches and 200 inches. During the processing of a specific log length, the operator can adjust the log length selector switch to a different log length which will be applicable to the remaining portion of the tree trunk for example. Once the present log will be cut, the new log length selection will become effective.

Jog

A jog signal causes the delimbing stroke to pause. The delimbing jaws 94 open slightly, and the delimbing stroke restarts slowly for cutting sturdy branches for example. When the jog button is released, the delimbing operation resumes normally.

Unload Program

This button overrides the automatic cycling operation. The unload program can be selected at any time during the processing of a tree, when for example the operator believes that the remaining portion of the tree is broken, rotten or otherwise of no value.

Open Jaws

This button causes any program to stop. The holding jaws 118 and the delimbing jaws 94 open fully for removing a tree trunk therefrom with the log loader 38. This feature is particularly useful for removing from the tree processor attachment a curved section of a tree, a large fork or other hard-to-process tree trunks.

Trim

The trim button overrides a normal operation of the tree processor. It causes the delimbing stroke to stop, and the severing saw to come down for removing a rotten butt for example. Once a cut is effected from a trim program, the advancing and delimbing portion 66 extends fully for obtaining a length of a first segment of the next log.

Sorter Manual/Automatic

This function enables a manual-only or an automatic operation of the log sorting cylinder 80.

Sorter Left/Right

This selector switch is for manually controlling to orientation of the log holding and severing portion 64 during a loading of a tree therein for example. This option is active at any time and can override the automatic operation of the log sorting cylinder 80.

Sorter Normal or L/R

A normal operation of the log sorter is when the pulpwood is piled near the cab 28 of the log porter 20, and the sawmill logs are piled near a rear wheel of the porter. The sorter inversion selector switch allows the operator to interchange the forming of log piles, according to the encumbrances of the site.

Boom Lift Pedal

The delimbing boom 106 may be raised or lowered by the operator, by means of a pedal switch (not shown). This feature is normally used to drop the logs on a respective pile with far end first, a near end first, or straight down, to form neat piles on a variety of ground slopes. The feature is also used during the loading of tree in the tree processor attachment 22.

The tree processor attachment 22 just described has few moving parts. The machine is relatively easy to retrofit on any common log porter. The machine is relatively inexpensive to manufacture and to maintain as compared to multifunction tree processors of the present-days trend. Therefore the tree processor attachment 22 and log porter 20 combination of the present invention is affordable by most small and medium size forestry contractors.

More importantly, the tree processor/log porter combination processes felled trees from stump sites to roadside in only one machine manipulation. This attribute renders a forestry operation highly efficient as compared to those operations using multiple equipment of the prior art.

This description of the invention as a tree processor attachment mounted transversely of a log carrying portion of a log porter shall not constitute a limitation in the scope of its application. Also it shall not constitute a limitation in the possible configuration of its elements. The tree processor attachment of the present invention may be mounted on a pulp truck or on other log carrying vehicles for example without requiring significant modification. Similarly numerous functions may be added or deleted from the automatic controls of the tree processor attachment without adversely affecting and overall performance thereof.

Therefore, the preferred embodiment of the present invention as described herein is not limited thereto, and it will be apparent to those skilled in the art that numerous modifications form part of the present invention insofar as they do not depart from the spirit, nature and scope of the described and claimed invention.

I claim:

1. A tree processor attachment for mounting on a log carrying portion of a log porter, said tree processor attachment comprising;

a tree trunk holding and severing portion having tree trunk holding means, and tree trunk severing means, a tree trunk advancing and delimbing portion having tree trunk advancing means and tree trunk delimbing means, said tree trunk advancing and delimbing portion being slidably mounted in said tree trunk holding and severing portion, and being movable back and forth relative to said tree trunk holding means along a tree trunk advancing axis, said tree trunk advancing means being operable in turns with said tree trunk holding means for moving said tree trunk in successive unidirectional movements along said tree trunk advancing axis toward said tree trunk severing means, mounting means for retaining said tree trunk holding and severing portion to said log carrying portion of said log porter, and hose means for receiving hydraulic power from an hydraulic power supply system of said log porter, whereby said tree processor attachment may be carded about a forest to delimb and severe felled trees into logs.

2. A tree processor attachment as claimed in claim 1 wherein;

said tree trunk severing means is controlled by a log measuring means wherein a log measurement is made relative to a number of full length movements of said tree trunk advancing and delimbing portion.

3. A tree processor attachment as claimed in claim 1 wherein;

said mounting means comprises a swivel member and said tree trunk holding and severing portion is pivotally movable within a sway angle about said swivel member.

4. A tree processor attachment as claimed in claim 3 wherein;

said tree trunk holding and severing portion is also pivotally movable within a tilt angle about bearing means on said swivel member.

5. A tree processor attachment as claimed in claim 3 further comprising control means for selectively severing logs at a first sway position or at a second sway position, depending upon a setting of said control means.

6. A tree processor attachment as claimed in claim 1 wherein;

said tree trunk advancing and delimbing portion is telescopically mounted in said tree trunk holding and severing portion, and is movable back and forth relative to said tree trunk holding means a distance of 50 inches.

7. A tree processor attachment as claimed in claim 6 further comprising a PLC for controlling an operation of said tree trunk severing means for processing logs having lengths corresponding to a multiple of 50 inches.

8. A tree processor attachment as claimed in claim 4 wherein said sway angle is about 40°, and said tilt angle is about 24°.

9. A tree processor attachment as claimed in claim 1 wherein said mounting means for retaining said tree trunk holding and severing portion to said log carrying portion of said tog porter is a pair of peg members on said tree trunk holding and severing portion, each of said peg members being mountable into a respective pocket along one side of said log carrying portion of said porter.

10. A tree processor attachment as claimed in claim 1 wherein said tree trunk holding and severing portion further comprises a series of solenoid operated hydraulic valves and a series of input switches mounted therein, and wherein an operation of said tree processor attachment is controllable by a PLC in a cab of said log porter, through a single control cable between said PLC and said tree trunk holding and severing portion.

11. A tree processor attachment as claimed in claim 10 wherein said hose means comprises exclusively a pressure hose, a return-to-tank hose and a drain hose.

12. A tree processor attachment as claimed in claim 10 wherein said input switches comprises a proximity switch for detecting a small diameter of said tree trunk and a photo-switch for locating a butt end of said tree trunk.

13. A tree processor attachment as claimed in claim 1 further comprising a lubrication system having a pump and a linkage means between said pump and said tree trunk severing means for effecting a lubrication of said tree trunk severing means only during a severing motion thereof.

14. A combination of a log porter and a tree processor attachment mounted on a log carrying portion of said log porter, said log porter having a log loader boom for handling felled trees into said tree processor attachment, said tree processor attachment comprising;

a tree trunk severing portion having tree trunk severing means, a tree trunk delimbing portion having tree trunk delimbing means, mounting means for retaining a base portion thereof to said log carrying portion, and hose means for receiving hydraulic power from an hydraulic power supply system of said log porter, whereby said combination of said log porter and said tree processor attachment is useable to process felled trees at stump sites and to carry logs therefrom to a forest road.

15. A combination of a log porter and a tree processor attachment as claimed in claim 14 wherein said tree trunk severing portion also comprises a tree trunk holding means, said tree trunk delimbing portion also comprises a tree trunk advancing means, said tree trunk delimbing portion being slidably mounted in said tree trunk severing portion, and being movable back and forth relative to said tree trunk holding means along a tree trunk advancing axis, said tree trunk advancing means being operable in turns with said tree trunk holding means for moving said tree trunk in successive tmidirectional movements along said trunk advancing axis and toward said tree trunk severing means, and said tree trunk severing means being operable by a log measuring means for severing logs from said tree trunk, a length of said logs being relative to a number of full length movements of said tree trunk delimbing portion.

16. A combination of a log porter and a tree processor attachment as claimed in claim 14, wherein said tree processing attachment is mounted transversely on a forward section of said log carrying portion.

17. A combination of a log porter and a tree processor attachment as claimed in claim 16, wherein said mounting means for retaining said base portion to said log carrying portion of said log porter comprises a pair of peg members on said base portion, each of said peg members being mountable into a respective pocket along one side of said log carrying portion of said porter, said peg member being similar in length than a length of said pocket, and a pair of cap plates each of which having a dimension larger than an opening in said pocket, and each of which being affixed to a lower end of one of said peg members, for securing each said peg member in said respective pocket.

18. A method for harvesting felled trees with a log porter and a tree processor attachment mounted on a log carrying portion of said log porter, comprising the steps of;

grabbing a first felled tree from a first stump site with a log grapple of an articulated boom of said log porter, loading said first felled tree into said tree processor attachment, delimbing and severing logs from said first felled tree, resetting a configuration of said tree processor attachment for receiving a second or subsequent felled tree therein, delimbing and severing said second or subsequent felled tree, loading said logs severed from said first, second and subsequent felled trees into a log carrying portion of said porter, moving said porter to a second stump site for delimbing and severing other felled trees, or near a forest road for unloading said logs from said log carrying portion.

19. A method for harvesting felled trees as claimed in claim 18 wherein said step of delimbing and severing each of said first, second or subsequent tree comprises the following sequences;

delimbing a first portion of said tree, advancing said tree to a photo-switch mounted adjacent a severing means of said tree processor attachment, delimbing a second portion of said tree, reading an initial length of said first portion of said tree plus said second portion of said tree, advancing and delimbing a third portion of said tree, severing a first log from said tree, said first being equal in length to said initial length plus a multiple of said first portion, advancing, delimbing and severing subsequent logs from said tree, said subsequent logs being equal in length to a multiple of said first portion, detecting a small trunk diameter of said tree, severing a last portion of said tree, reversing said advancing of said tree for removing from said tree processor attachment a top portion thereof.

20. A method for harvesting felled trees as claimed in claim 19 wherein said step of severing said first or said subsequent logs from said tree comprises the sequence of;

swaying said tree processor attachment in a first position or in a second position, said first and second positions being relative to a length of each of said first or subsequent logs.

* * * * *